J. & G. KEITH.
GAS LAMP.
APPLICATION FILED DEC. 19, 1912.

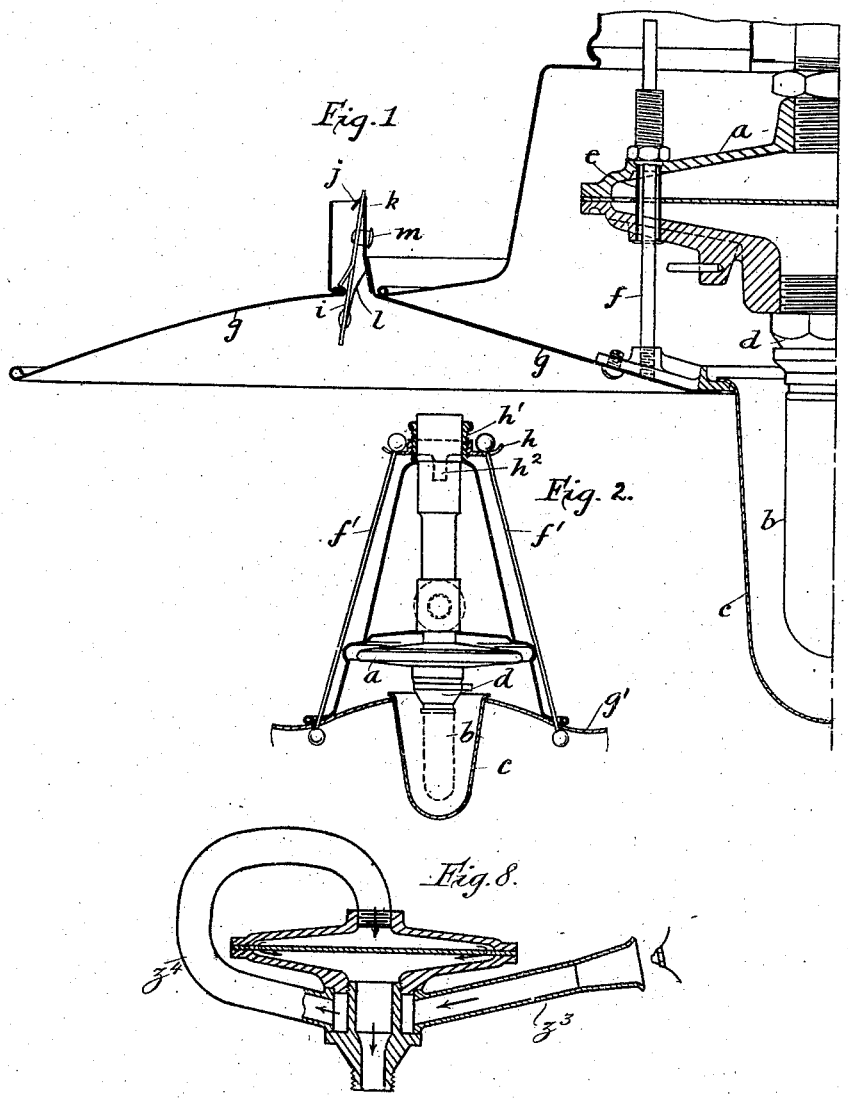

1,080,149.

Patented Dec. 2, 1913.
3 SHEETS—SHEET 2.

WITNESSES

INVENTORS
J. KEITH AND G. KEITH
BY
ATTORNEY

J. & G. KEITH.
GAS LAMP.
APPLICATION FILED DEC. 19, 1912.

1,080,149.

Patented Dec. 2, 1913.
3 SHEETS—SHEET 3.

WITNESSES

INVENTORS
J. KEITH AND G. KEITH
BY
ATTORNEY

UNITED STATES PATENT OFFICE.

JAMES KEITH AND GEORGE KEITH, OF LONDON, ENGLAND.

GAS-LAMP.

1,080,149.   Specification of Letters Patent.   Patented Dec. 2, 1913.

Application filed December 19, 1912. Serial No. 737,671.

*To all whom it may concern:*

Be it known that we, JAMES KEITH and GEORGE KEITH, subjects of the King of the United Kingdom of Great Britain and Ireland, and residing at London, England, have invented a certain new and useful Improvement in Gas-Lamps, of which the following is a specification.

This invention relates to improvements in so-called high pressure inverted incandescent gas lamps in which air is introduced under pressure or a mixture is introduced under pressure.

Suggestions have been made for dispensing with secondary air in high pressure inverted incandescent gas lamps and though some measure of success has been obtained by the use of primary air alone the highest efficiency has not been reached owing to want of knowledge of the best conditions. We find that when primary air alone is used in high pressure inverted incandescent gas lamps the globe should quite closely surround the mantle. Ordinary glass globes present difficulties owing to their liability to fusion and we therefore form our globes of fused silica the use of which has been already suggested as a support or cover for mantles of ordinary low pressure incandescent lamps. None of the conditions essential to the successful use of such silica globes has hitherto been disclosed. The gas and air mixture or the air supply is heated, and the mixture led downwardly under pressure into a chamber of small dimensions, said chamber being closed or practically closed against ingress of the surrounding atmosphere, to insure exclusion of secondary air. In this way, on account of concentration of the heat in the neighborhood of the mantle, a maximum lighting effect is obtained; while, on account of the resistance to the downward passage of the flame offered by the globe, it is possible to employ with advantage a mantle of more open texture than heretofore.

Figure 3:
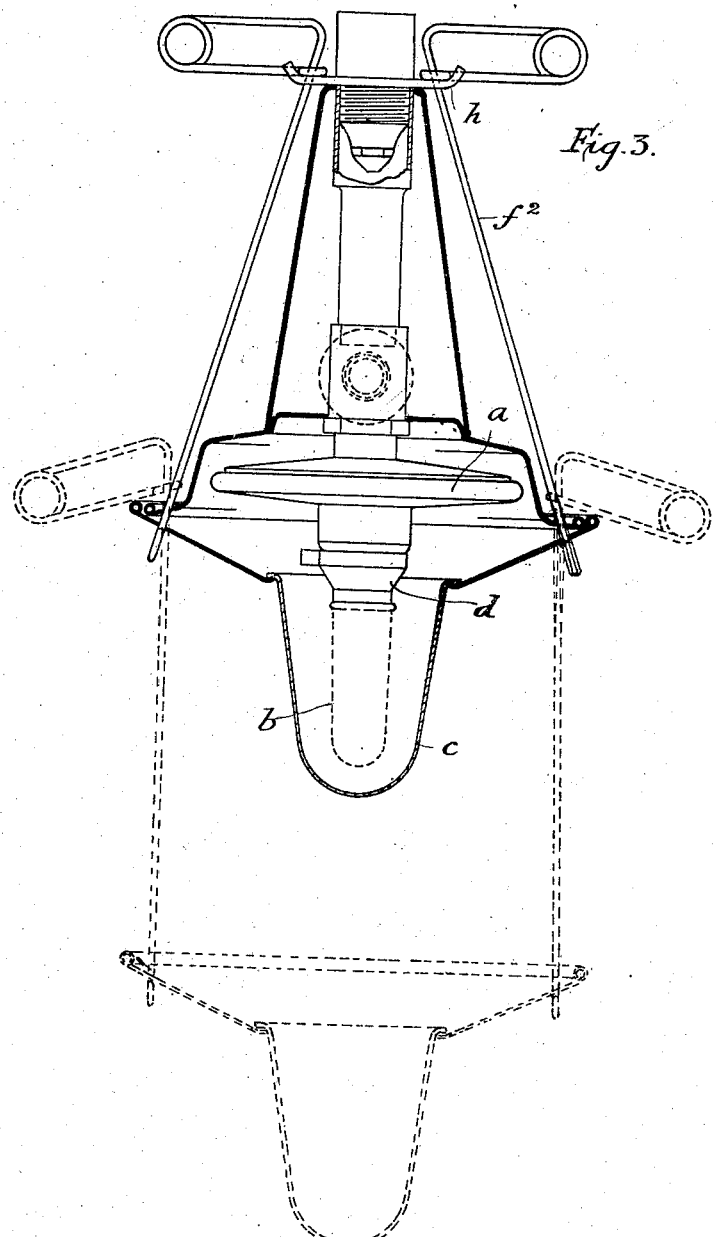
Figure 4:
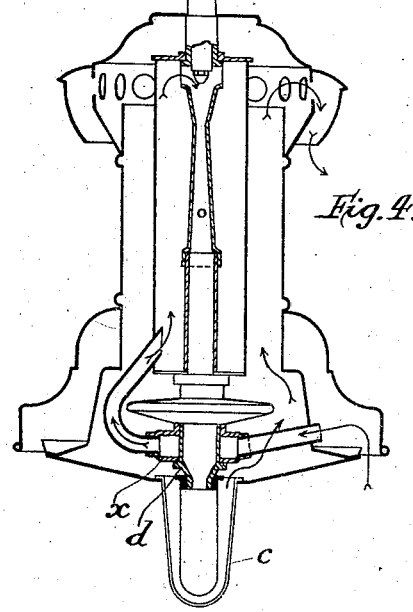
Figure 6:
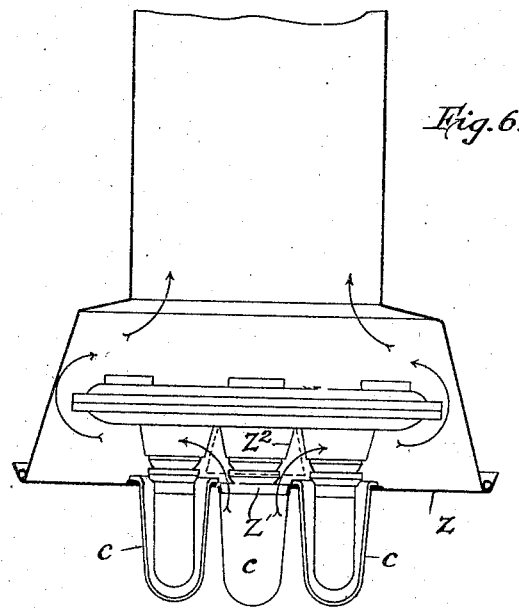
Figure 5:
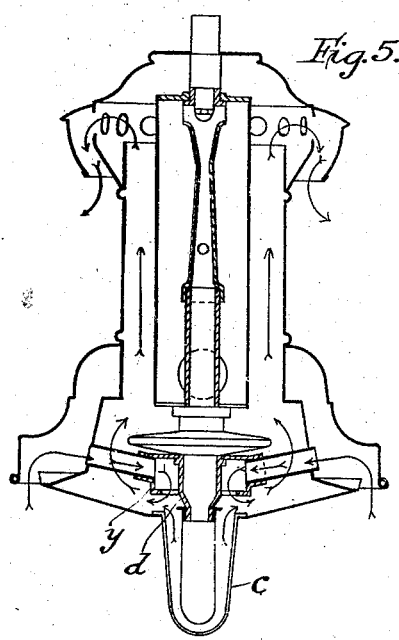
Figure 7:
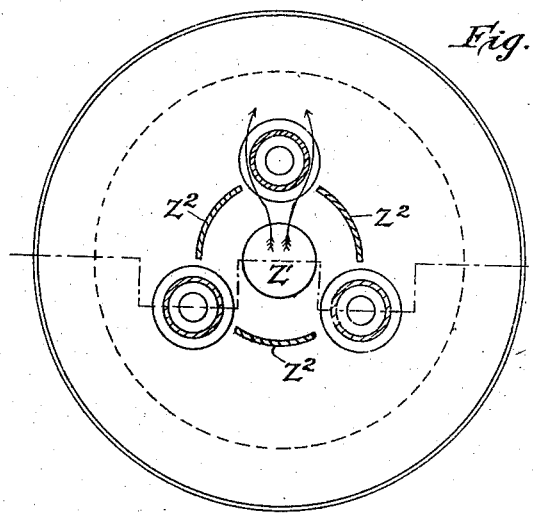

In the accompanying drawings Figure 1 is a vertical section of one half of a lamp embodying the invention; Figs. 2 and 3 show lamps of similar construction, with alternative means for supporting the globe; Fig. 4 is a vertical section, of a modified construction, provided with means for leading past a nozzle a cooling current which serves as primary air; Fig. 5 shows an alternative construction in which the cooling current is discharged with the products of combustion into the atmosphere; Figs. 6 and 7 are vertical section and sectional plan, illustrating a multiple burner lamp; Fig. 8 is a detail of a construction of lamp in which the mixture is employed to cool the nozzle before entering the heater.

The same reference characters denote similar parts in the several views.

As shown, the general construction of the metallic part of the lamp is similar to that described in the specification of Letters Patent No. 917876, the lamp being fitted with a heater $a$ for the gas and air mixture, or with a heater for the primary air and with a metallic nozzle of heavy section directly connected to the heater. The mantle $b$ into which is led the highly heated self-burning mixture of gas and air is surrounded by a small transparent cylinder or globe $c$ of a mean diameter which we find from experimental research may vary from about one and one half times to about thrice the mean diameter of the mantle but which by preference is of the smaller diameter. The cylinder or globe has a closed bottom, excluding secondary air, so that the mantle is immersed in a very hot atmosphere; the bottom of the cylinder or globe being spaced from the bottom of the mantle a distance which may approximate to the distance between the vertical sides of the globe and the vertical sides of the mantle; in other words, the wall of the globe is spaced from the mantle around and below the same a distance not exceeding the mean diameter of the mantle, the globe being, in every case, located within a field of temperature destructive of glass. The said cylinder or globe $c$ is shown as being of conoidal form, *i. e.*, tapered at its lower end. The conoidal shape, though not essential, gives the best results.

An arrangement may be provided for heating the air such that cold air is drawn through a jacket $x$, Fig. 4, around the nozzle $d$, or each nozzle, and thence to the inlet of the injector, as indicated by arrows, the cooling current thus serving to keep down the temperature of the nozzle or nozzles. Alternatively, there may be fitted around the upper portion of the nozzle or of each nozzle an annular jacket $y$, Fig. 5, to which connections are led from the outside, so that the suction of the chimney may draw cold air in through these connections, and discharge it on to the nozzle and thence downward, as indicated by arrows, whereby the hot products ascending from the cylinder $c$ are prevented from concentrating on the upper portion of the nozzle $d$, the effect of the downward flow of cooler air being to cause the ascending products from the cylinder $c$ to spread out in a horizontal direction; or a reflector $z$, Figs. 6 and 7, may be provided with a central aperture $z^1$ through which a cooling current of air is drawn by the chimney, the cold air being confined by baffles $z^2$ so that it will impinge on the nozzles; or, as shown in Fig. 8, the mixture may be caused to cool the nozzle, being itself heated thereby, the air being drawn into the pipe $z^3$ under the action of the gas injector, and so to a jacket surrounding the nozzle, thence by a pipe connection $z^4$ to the heater through which it passes to the interior of the nozzle, as indicated by the arrows.

In a lamp constructed as above described, owing to the small amount of clearance between the cylinder and the side of the mantle, there would ordinarily be a considerable liability of the mantle being damaged by the act of opening or closing the lamp. To obviate this drawback, we may provide devices for guiding the cylinder vertically in such a way as to prevent damage to the mantle, such guiding devices being also adapted to act as hangers when the cylinder is lowered, so that the cylinder need not be touched by the hand—which latter is an important consideration inasmuch as the mere handling of a fused quartz cylinder by the bare fingers creates a deposit on the surface of the cylinder, which, when heated, is converted into an opaque body and so obscures the light. For example, in the case shown in Fig. 1, we lead through vertical tubes $e$ fitted to the heater $a$, two or more vertical rods $f$ attached to a reflector body $g$ having a central aperture into which the cylinder $c$ is dropped, the outer portion of said reflector body $g$ being supported by catches, each of which catches may comprise a flat strip $i$ in hinge-like engagement with a bent portion $j$ of a strip $k$ secured to the inner portion of the reflector, a spring $l$ tending to move the strip $i$ outwardly being provided, and a rivet $m$ or the like passing through the strip $k$ and secured to the strip $i$ serving to support the catch, the arrangement being such that when the outer portion of the reflector is moved upwardly each strip $i$ is sprung outwardly to engage the inner rim of the reflector, as shown in Fig. 1, which may then be secured in position by any suitable tightening means. Alternately, as shown in Fig. 2, two or more rods or wires $f^1$ attached to a reflector body $g^1$ may be fitted to slide through guide holes in the body of the lamp and be held in raised position by engagement with a forked member $h$ adapted to be raised and lowered by rotation of a sleeve $h^1$ in screw-threaded engagement with the forked member $h$ and abutting at its lower end against the upper end of the lamp body so as to tension the rods and hold the reflector hard up against the lamp body, said forked member $h$ being provided with a prong $h^2$ extending downwardly into a hole in the lamp body so as to prevent rotation of said member.

As shown in Fig. 3 the fitting may be such that the wires $f^2$ will be self-tensioned, the upper ends of the wires being formed as springs in engagement with a stationary forked member $h$.

What we claim is:—

1. In combination, an inverted high pressure incandescent gas burner, a mantle therefor, and a globe of fused silica inclosing the mantle and when in use practically closed against ingress of secondary air, said globe being located within a field of temperature destructive of glass.

2. In an inverted incandescent high pressure gas lamp, in combination, an inverted mantle, means for leading a self-burning mixture of gas and air downwardly into the mantle, a globe of translucent refractory material surrounding the mantle and constituting a combustion chamber, said globe being practically closed against ingress of air other than that entering the mantle, and so dimensioned as to be located within a field of temperature destructive of glass.

3. In combination, a high pressure incandescent gas burner and a globe having a connection with the burner such as practically to prevent ingress of secondary air, said globe being composed of highly refractory light-transmitting material and located within a field of temperature destructive of glass.

In testimony whereof we have signed our names to this specification in the presence of two subscribing witnesses.

JAMES KEITH.
GEORGE KEITH.

Witnesses:
 WALLACE CRANSTON FAIRWEATHER,
 JOHN McCLEARY.